(12) United States Patent
Shih et al.

(10) Patent No.: US 9,251,750 B2
(45) Date of Patent: *Feb. 2, 2016

(54) LCD MODULE AND MANUFACTURING METHOD THEREOF

(75) Inventors: Ming-Hung Shih, Shenzhen (CN); Meng Li, Shenzhen (CN)

(73) Assignee: SHENZHEN CHINA STAR OPTOELECTRONICS TECHNOLOGY CO., LTD., Shenzhen, Guangdong Province (CN)

( * ) Notice: Subject to any disclaimer, the term of this patent is extended or adjusted under 35 U.S.C. 154(b) by 589 days.

This patent is subject to a terminal disclaimer.

(21) Appl. No.: 13/379,650

(22) PCT Filed: Dec. 2, 2011

(86) PCT No.: PCT/CN2011/083367
§ 371 (c)(1),
(2), (4) Date: Dec. 20, 2011

(87) PCT Pub. No.: WO2013/071659
PCT Pub. Date: May 23, 2013

(65) Prior Publication Data
US 2013/0120696 A1 May 16, 2013

(30) Foreign Application Priority Data
Nov. 14, 2011 (CN) .......................... 2011 1 0360153

(51) Int. Cl.
*G02F 1/13* (2006.01)
*G09G 3/36* (2006.01)
*G09G 3/00* (2006.01)
*G02F 1/1362* (2006.01)
*G02F 1/1333* (2006.01)

(52) U.S. Cl.
CPC ............ *G09G 3/3648* (2013.01); *G02F 1/1309* (2013.01); *G09G 3/006* (2013.01); *G02F 1/1303* (2013.01); *G02F 2001/133302* (2013.01); *G02F 2001/136254* (2013.01); *G02F 2201/54* (2013.01)

(58) Field of Classification Search
CPC .................. G06F 2001/136254; G06F 1/1309; G06F 1/1303; G09G 3/006
USPC .................... 324/760.01, 760.02; 349/54, 192
See application file for complete search history.

(56) References Cited

U.S. PATENT DOCUMENTS 6,300,998 B1 * 10/2001 Aruga ............................ 349/192
6,791,658 B2 * 9/2004 Maruyama et al. ........... 349/183

(Continued)

FOREIGN PATENT DOCUMENTS

| CN | 1512219 A | 7/2004 |
| CN | 1897094 A | 1/2007 |
| CN | 1922500 A | 2/2007 |
| CN | 101446699 A | 6/2009 |
| CN | 101923236 A | 12/2010 |

*Primary Examiner* — Jessica M Merlin
*Assistant Examiner* — Mark Teets
(74) *Attorney, Agent, or Firm* — Cheng-Ju Chiang

(57) ABSTRACT

A liquid crystal display (LCD) module is disclosed, which comprises: a thin film transistor (TFT) substrate and a color filter (CF) substrate disposed opposite to each other, and a liquid crystal layer sandwiched between the TFT substrate and the CF substrate. The TFT substrate comprises a plurality of wires including at least a first group of wires and a second group of wires, and the second group of wires comprises at least two wires. The CF substrate comprises first curing test units and second curing test units insulated from each other. The first curing test units are electrically connected with the first group of wires, and the second curing test units are electrically connected with all the wires of the second group of wires. A manufacturing method of an LCD module is further disclosed. The LCD module and the manufacturing method thereof of the present disclosure can avoid occurrence of arcing in the TFT substrate during the CVD process, thereby improving the product yield and reducing the manufacturing cost.

16 Claims, 3 Drawing Sheets

(56) References Cited

U.S. PATENT DOCUMENTS

| | | | |
|---|---|---|---|
| 7,027,123 B2 * | 4/2006 | Chae et al. | 349/192 |
| 2001/0020988 A1 | 9/2001 | Ohgiichi et al. | |
| 2009/0059110 A1 * | 3/2009 | Sasaki et al. | 349/39 |
| 2010/0007841 A1 * | 1/2010 | Baek et al. | 349/152 |
| 2013/0128169 A1 * | 5/2013 | Shih et al. | 349/43 |
| 2015/0268274 A1 * | 9/2015 | Song | G09G 3/006 324/754.1 |

* cited by examiner

LCD MODULE AND MANUFACTURING METHOD THEREOF

FIELD OF THE INVENTION

The present disclosure generally relates to the technical field of liquid crystal displaying, and more particularly, to a liquid crystal display (LCD) module and a manufacturing method thereof.

BACKGROUND OF THE INVENTION

LCD devices have been widely used in, for example, mobile phones, personal digital assistants (PDAs), notebook computers, personal computers (PCs) and television (TV) sets because of their low radiation level, light weight, thin profile, small volume and low power consumption.

An LCD device mainly comprises an LCD panel and a backlight module for providing a light source for the LCD panel. The LCD panel comprises a thin film transistor (TFT) substrate and a color filter (CF) substrate that are disposed opposite to each other, and a liquid crystal layer sandwiched between the TFT substrate and the CF substrate.

Common LCD devices suffer from a drawback that they have a narrow view-angle range. That is, the contrast of the LCD devices will decrease significantly when users viewing the LCD panels thereof in a direction offset from the normal direction of the LCD panels. This drawback becomes particularly prominent as the LCD devices evolve towards large sizes. Accordingly, many technologies for enlarging the view-angle range (i.e., providing a wide view angle) of the LCD devices have been developed.

In a process of manufacturing a wide view-angle LCD device, a curing test block is fabricated on a TFT substrate, the TFT substrate and a CF substrate are assembled together and a liquid crystal material is filled therebetween. Then, an edge portion of the CF substrate corresponding to the curing test block is removed to expose the curing testing block fabricated on the TFT substrate, and a voltage signal is inputted to the curing test block for testing purpose.

However, the aforesaid manufacturing process has a significant shortcoming that: because the effective display region of the LCD device is required to be as large as possible, a spacing between the curing test block fabricated on the TFT substrate and the edge of the TFT substrate is restricted to a small range. Consequently, arcing tends to occur in the TFT substrate during the chemical vapor deposition (CVD) process, which degrades the product yield of the manufacturing process.

SUMMARY OF THE INVENTION

The primary objective of the present disclosure is to avoid occurrence of arcing in the TFT substrate during the CVD process.

To achieve the aforesaid objective, the present disclosure provides a liquid crystal display (LCD) module, which comprises a thin film transistor (TFT) substrate and a color filter (CF) substrate disposed opposite to each other, and a liquid crystal layer sandwiched between the TFT substrate and the CF substrate. The TFT substrate comprises a plurality of wires including at least a first group of wires and a second group of wires, and the second group of wires comprises at least two wires. The CF substrate comprises a transparent conductive layer, and first curing test units and second curing test units insulated from each other. The first curing test units and the second curing test units are formed by cutting the transparent conductive layer. Each of the first curing test units and a corresponding one of the second curing test units form a group of curing test components. The first curing test unit and the second curing test unit in a same group of curing test components are located at a same side of the CF substrate. The first curing test units are electrically connected with the first group of wires, and the second curing test units are electrically connected with all the wires of the second group of wires.

Preferably, the CF substrate comprises two groups of curing test components located at two opposite sides of the CF substrate respectively.

Preferably, the two groups of curing test components are located respectively at two opposite edges of the CF substrate adjacent to a surface of the TFT substrate.

Preferably, the first group of wires includes a first common electrode, and the second group of wires includes a second common electrode and a plurality of routing lines. The two first curing test units in the two groups of curing test components are both electrically connected with the first common electrode, and the two second curing test units in the two groups of curing test components are both electrically connected with the second common electrode and the plurality of routing lines.

Preferably, the TFT substrate comprises a plurality of relay conductive units. Terminals of the first group of wires and the second group of wires are connected with the relay conductive units respectively. The first curing test units are electrically connected with the first common electrode via the relay conductive units, and the second curing test units are electrically connected with the second common electrode and the routing lines via the relay conductive units respectively.

Preferably, the first common electrode is a CF common electrode, and the second common electrode is a TFT common electrode.

Preferably, the transparent conductive layer is made of one of indium tin oxide (ITO) and indium zinc oxide (IZO).

To achieve the aforesaid objective, the present disclosure further provides an LCD module, which comprises a TFT substrate and a CF substrate disposed opposite to each other, and a liquid crystal layer sandwiched between the TFT substrate and the CF substrate. The TFT substrate comprises a plurality of wires including at least a first group of wires and a second group of wires, and the second group of wires comprises at least two wires. The CF substrate comprises first curing test units and second curing test units insulated from each other. The first curing test units are electrically connected with the first group of wires, and the second curing test units are electrically connected with all the wires of the second group of wires.

Preferably, each of the first curing test units and a corresponding one of the second curing test units form a group of curing test components, and the first curing test unit and the second curing test unit in a same group of curing test components are located at a same side of the CF substrate.

Preferably, the CF substrate comprises two groups of curing test components located at two opposite sides of the CF substrate respectively.

Preferably, the two groups of curing test components are located respectively at two opposite edges of the CF substrate adjacent to a surface of the TFT substrate.

Preferably, the first group of wires includes a first common electrode, and the second group of wires includes a second common electrode and a plurality of routing lines. The two first curing test units in the two groups of curing test components are both electrically connected with the first common electrode, and the two second curing test units in the two groups of curing test components are both electrically connected with the second common electrode and the plurality of routing lines.

Preferably, the TFT substrate comprises a plurality of relay conductive units. Terminals of the first group of wires and the second group of wires are connected with the relay conductive units respectively. The first curing test units are electrically connected with the first common electrode via the relay conductive units, and the second curing test units are electrically connected with the second common electrode and the routing lines via the relay conductive units respectively.

Preferably, the first common electrode is a CF common electrode, and the second common electrode is a TFT common electrode.

Preferably, the CF substrate comprises a transparent conductive layer, and the first curing test units and the second curing test units are formed by cutting the transparent conductive layer.

Preferably, the transparent conductive layer is made of one of ITO and IZO.

To achieve the aforesaid objective, the present disclosure further provides a manufacturing method of an LCD module, which comprises: fabricating a plurality of wires on a surface of a TFT substrate, wherein the plurality of wires comprises at least a first group of wires and a second group of wires, and the second group of wires comprises at least two wires; fabricating first curing test units and second curing test units on a surface of a CF substrate; assembling the TFT substrate and the CF substrate together and filling a liquid crystal material therebetween, and electrically connecting the first curing test units with the first group of wires and electrically connecting the second curing test units with all the wires of the second group of wires; and removing portions of the TFT substrate that correspond to the first curing test units and the second curing test units.

Preferably, a voltage signal is inputted to the first curing test units and the second curing test units for inspection purpose after the portions of the TFT substrate that correspond to the first curing test units and the second curing test units are removed.

The present disclosure has the following benefits: as compared with the prior art, the LCD module and the manufacturing method thereof according to the present disclosure have the curing test units disposed on a surface of the CF substrate opposite to the TFT substrate. This can avoid occurrence of arcing in the TFT substrate during the CVD process. As a result, the product yield is improved, and fixtures can be used in common for a plurality of products to reduce the manufacturing cost.

BRIEF DESCRIPTION OF THE DRAWINGS

In order to more clearly describe the technical solutions of the embodiments of the present disclosure, attached drawings to be used in the detailed description of the disclosure will be briefly described hereinbelow. Obviously, the attached drawings described hereinbelow only illustrate some of the embodiments of the present disclosure, and those of ordinary skill in the art can also obtain other attached drawings therefrom without the need of making inventive efforts, wherein.

DETAILED DESCRIPTION OF THE INVENTION

Figure 1:
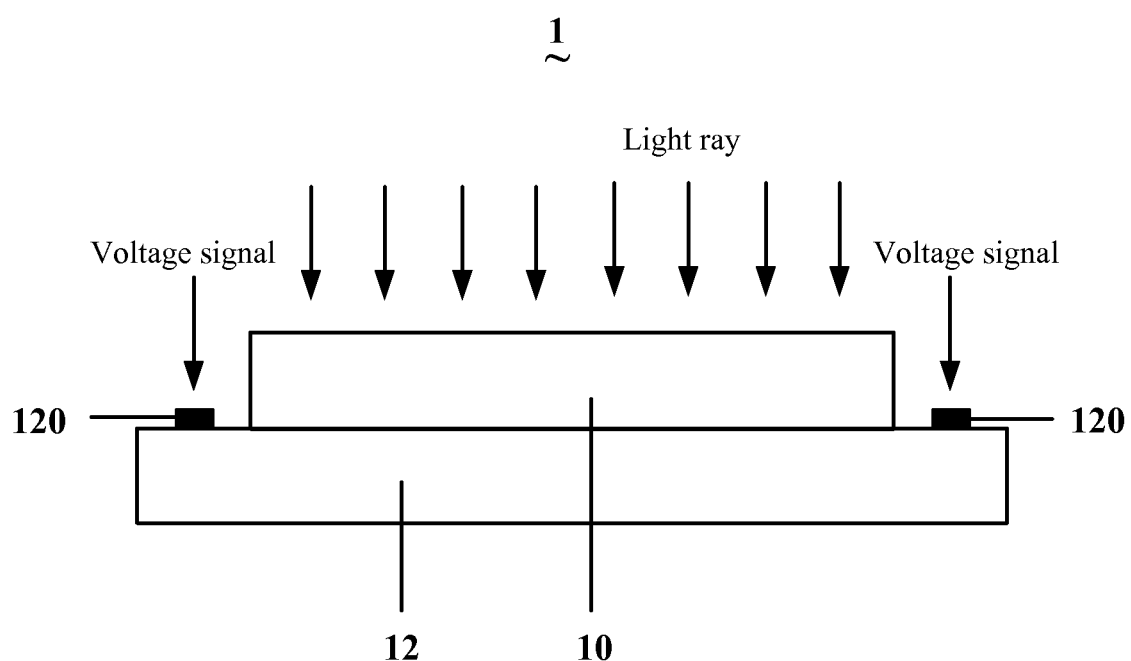
FIG. 1 is a schematic side view illustrating a structure of an LCD module according to a preferred embodiment of the present disclosure.

Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Hereinbelow, the technical solutions of embodiments of the present disclosure will be described clearly and completely with reference to the attached drawings. Obviously, the embodiments described herein are only some of the embodiments of the present disclosure but do not represent all embodiments of the disclosure. All other embodiments that can be devised by those of ordinary skill in the art on the basis of the embodiments described herein and without making inventive efforts shall fall within the scope of the present disclosure.

Figure 2:
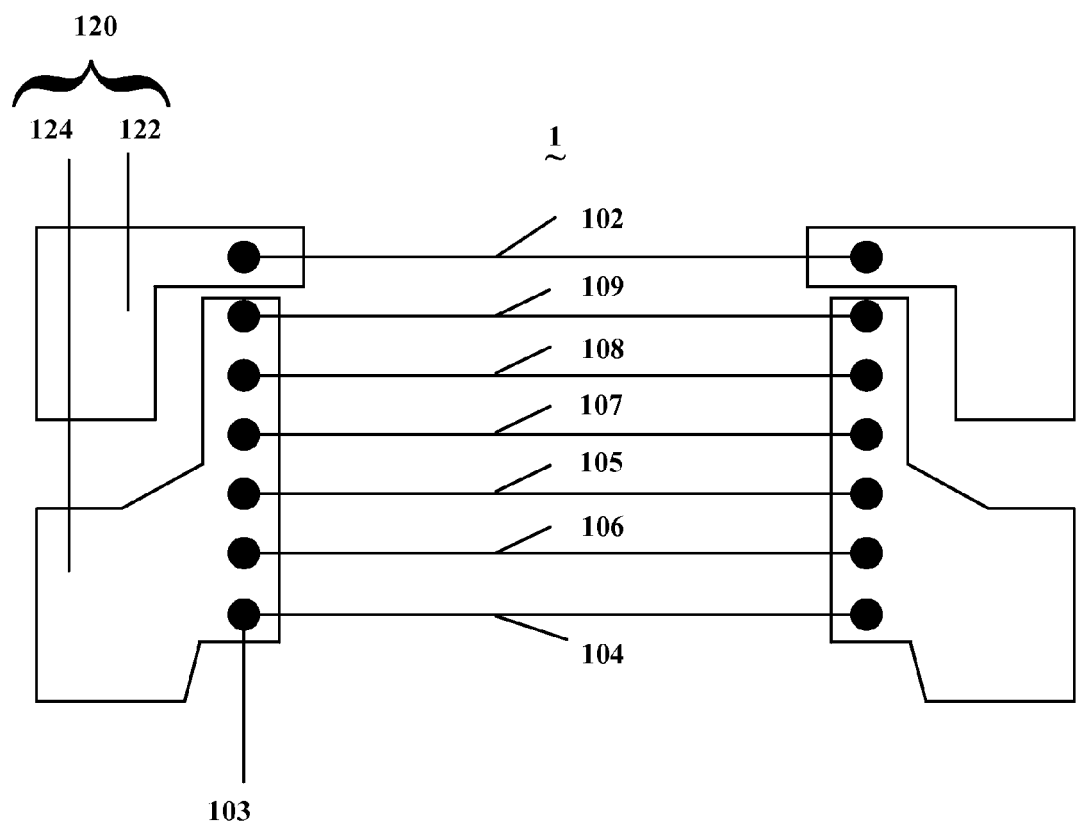
FIG. 2 is a schematic structural view of routing lines of the LCD module shown in FIG. 1.

A liquid crystal display (LCD) module is disclosed in the present disclosure. Referring to FIG. 1 and FIG. 2, FIG. 1 is a schematic side view illustrating a structure of an LCD module according to a preferred embodiment of the present disclosure; and FIG. 2 is a schematic structural view of routing lines of the LCD module shown in FIG. 1.

The LCD module 1 comprises a thin film transistor (TFT) substrate 10 and a color filter (CF) substrate 12 disposed opposite to each other, and a liquid crystal layer (not shown) sandwiched between the TFT substrate 10 and the CF substrate 12.

The TFT substrate 10 comprises a plurality of wires including at least a first group of wires and a second group of wires, and the second group of wires comprises at least two wires.

The CF substrate 12 comprises first curing test units 122 and second curing test units 124 insulated from each other. The first curing test units 122 and the second curing test units 124 are electrically connected with the plurality of wires respectively. The first curing test units 122 are electrically connected with the first group of wires, and the second curing test units 124 are electrically connected with all the wires of the second group of wires.

The first group of wires includes a first common electrode 102, and the second group of wires includes a second common electrode 104, odd gate lines 105, even gate lines 106 and RGB (red, green, blue) pixel electrode lines 107, 108, 109. The first group of wires and the second group of wires are disposed in parallel with each other and insulated from each other.

The first curing test units 122 are electrically connected with the first common electrode 102. The second curing test units 124 are electrically connected with the second common electrode 104, the odd gate lines 105, the even gate lines 106 and the RGB pixel electrode lines 107, 108, 109.

The CF substrate 12 further comprises a transparent conductive layer (not shown). The first curing test units 122 and the second curing test units 124 may be formed by using a laser repair machine to laser cut the transparent conductive layer on a surface of the CF substrate 12. Preferably, the transparent conductive layer may be made of one of indium tin oxide (ITO) and indium zinc oxide (IZO).

Further, each of the first curing test units 122 and a corresponding one of the second curing test units 124 form a group of curing test components 120. The first curing test unit 122 and the second curing test unit 124 in a same group of curing test components 120 are located at a same side of the CF substrate 12. In this embodiment, the CF substrate 12 comprises two groups of curing test components 120 located at two opposite sides of the CF substrate 12 respectively. Further, the two groups of curing test components 120 are respectively adjacent to two opposite edges of the CF substrate 12 adjacent to a surface of the TFT substrate 10.

That is, each of the groups of curing test components 120 is electrically connected with the first group of wires and the second group of wires respectively. The two first curing test units 122 in the two groups of curing test components 120 are both electrically connected with the first common electrode 102, and the two second curing test units 124 in the two groups of curing test components 120 are both electrically connected with the second common electrode 104, the odd gate lines 105, the even gate lines 106 and the RGB pixel electrode lines 107, 108, 109.

The TFT substrate 10 further comprises a plurality of relay conductive units 103. Electrical terminals of the first common electrode 102, the second common electrode 104, the odd gate lines 105, the even gate lines 106 and the RGB pixel electrode lines 107, 108, 109 are connected with the relay conductive units 103 respectively. That is, the first curing test units 122 are electrically connected with the first common electrode 102 in the first group of wires via the relay conductive units 103, and the second curing test units 124 are electrically connected with the second common electrode 104, the odd gate lines 105, the even gate lines 106 and the RGB pixel electrode lines 107, 108, 109 in the second group of wires via the relay conductive units 103 respectively.

Figure 3:
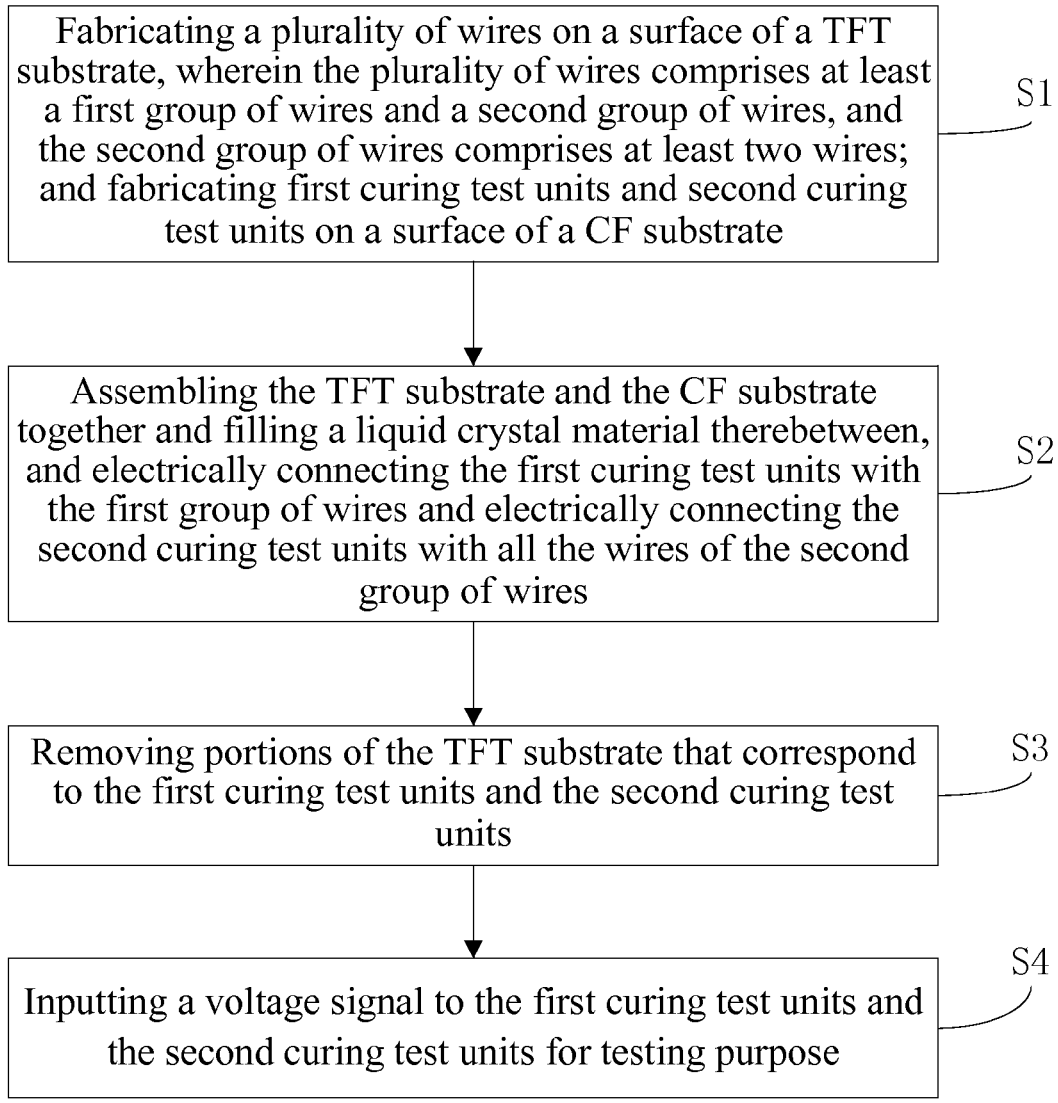
FIG. 3 is a schematic flowchart diagram of a manufacturing method of an LCD module according to a preferred embodiment of the present disclosure.

A manufacturing method of an LCD module is further disclosed in the present disclosure. Referring to FIG. 3, the manufacturing method comprises:

step S1: fabricating a plurality of wires on a surface of a TFT substrate, wherein the plurality of wires comprises at least a first group of wires and a second group of wires, and the second group of wires comprises at least two wires; and fabricating first curing test units and second curing test units on a surface of a CF substrate;

step S2: assembling the TFT substrate and the CF substrate together and filling a liquid crystal material therebetween, and electrically connecting the first curing test units with the first group of wires and electrically connecting the second curing test units with all the wires of the second group of wires; and step S3: removing portions of the TFT substrate that correspond to the first curing test units and the second curing test units.

In the step S3, the removing process may be accomplished through the conventional edge cut process, and thus will not be further described herein.

Furthermore, the manufacturing method further comprises a step S4 of inputting a voltage signal to the first curing test units and the second curing test units for inspection purpose after the portions of the TFT substrate that correspond to the first curing test units and the second curing test units are removed.

The present disclosure has the following benefits: as compared with the prior art, the LCD module and the manufacturing method thereof according to the present disclosure have the curing test units disposed on a surface of the CF substrate opposite to the TFT substrate. This can avoid occurrence of arcing in the TFT substrate during the CVD process, thereby improving the product yield. Furthermore, because only two groups of curing test components are needed and only two curing test units are needed in each of the groups of curing test components, a corresponding fixture mechanism can be designed to be movable so as to be used in common, thereby reducing the manufacturing cost.

According to the above descriptions, the LCD module and the manufacturing method thereof according to the present disclosure can avoid occurrence of arcing in the TFT substrate during the CVD process and achieve sharing of a fixture, thereby improving the product yield and reducing the manufacturing cost.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A liquid crystal display (LCD) module, comprising:
a thin film transistor (TFT) substrate and a color filter (CF) substrate disposed opposite to each other, and a liquid crystal layer sandwiched between the TFT substrate and the CF substrate; wherein:
the TFT substrate comprises a plurality of wires including at least a first group of one or more wires and a second group of wires, and the second group of wires comprises at least two wires; and
the CF substrate comprises first curing test units and second curing test units insulated from each other, the first curing test units and the second curing test units are formed by cutting a transparent conductive layer of the CF substrate, each of the first curing test units and a corresponding one of the second curing test units form a group of curing test components, the first curing test unit and the second curing test unit in a same group of curing test components are located at a same side of the CF substrate, the first curing test units are electrically connected with the first group of wires, and the second curing test units are electrically connected with all the wires of the second group of wires.

2. The LCD module of claim 1, wherein the CF substrate comprises two groups of curing test components located at two opposite sides of the CF substrate respectively.

3. The LCD module of claim 2, wherein the two groups of curing test components are located respectively at two opposite edges of the CF substrate adjacent to a surface of the TFT substrate.

4. The LCD module of claim 2, wherein the first group of wires includes a first common electrode, the second group of wires includes a second common electrode and a plurality of routing lines, the two first curing test units in the two groups of curing test components are both electrically connected with the first common electrode, and the two second curing test units in the two groups of curing test components are both electrically connected with the second common electrode and the plurality of routing lines.

5. The LCD module of claim 4, wherein the TFT substrate comprises a plurality of relay conductive units, terminals of the first group of wires and the second group of wires are connected with the relay conductive units respectively, the first curing test units are electrically connected with the first common electrode via the relay conductive units, and the second curing test units are electrically connected with the second common electrode and the routing lines via the relay conductive units respectively.

6. The LCD module of claim 1, wherein the transparent conductive layer is made of one of indium tin oxide (ITO) and indium zinc oxide (IZO).

7. An LCD (liquid crystal display) module, comprising:
a thin film transistor (TFT) substrate and a color filter (CF) substrate disposed opposite to each other, and a liquid crystal layer sandwiched between the TFT substrate and the CF substrate; wherein:
the TFT substrate comprises a plurality of wires including at least a first group of one or more wires and a second group of wires, and the second group of wires comprises at least two wires; and
the CF substrate comprises first curing test units and second curing test units insulated from each other, the first curing test units are electrically connected with the first group of wires, and the second curing test units are electrically connected with all the wires of the second group of wires.

8. The LCD module of claim 7, wherein each of the first curing test units and a corresponding one of the second curing test units form a group of curing test components, and the first curing test unit and the second curing test unit in a same group of curing test components are located at a same side of the CF substrate.

9. The LCD module of claim 8, wherein the CF substrate comprises two groups of curing test components located at two opposite sides of the CF substrate respectively.

10. The LCD module of claim 9, wherein the two groups of curing test components are located respectively at two opposite edges of the CF substrate adjacent to a surface of the TFT substrate.

11. The LCD module of claim 9, wherein the first group of wires includes a first common electrode, the second group of wires includes a second common electrode and a plurality of routing lines, the two first curing test units in the two groups of curing test components are both electrically connected with the first common electrode, and the two second curing test units in the two groups of curing test components are both electrically connected with the second common electrode and the plurality of routing lines.

12. The LCD module of claim 11, wherein the TFT substrate comprises a plurality of relay conductive units, terminals of the first group of wires and the second group of wires are connected with the relay conductive units respectively, the first curing test units are electrically connected with the first common electrode via the relay conductive units, and the second curing test units are electrically connected with the second common electrode and the routing lines via the relay conductive units respectively.

13. The LCD module of claim 7, wherein the first curing test units and the second curing test units are formed by cutting a transparent conductive layer of the CF substrate.

14. The LCD module of claim 13, wherein the transparent conductive layer is made of one of indium tin oxide (ITO) and indium zinc oxide (IZO).

15. A manufacturing method of an LCD (liquid crystal display) module, comprising:
fabricating a plurality of wires on a surface of a thin film transistor (TFT) substrate, wherein the plurality of wires comprises at least a first group of wires and a second group of wires, and the second group of wires comprises at least two wires; and fabricating first curing test units and second curing test units on a surface of a color filter (CF) substrate;
assembling the TFT substrate and the CF substrate together and filling a liquid crystal material therebetween, and electrically connecting the first curing test units with the first group of wires and electrically connecting the second curing test units with all the wires of the second group of wires; and
removing portions of the TFT substrate that correspond to the first curing test units and the second curing test units.

16. The manufacturing method of claim 15, wherein a voltage signal is inputted to the first curing test units and the second curing test units for inspection purpose after the portions of the TFT substrate that correspond to the first curing test units and the second curing test units are removed.

* * * * *